(12) United States Patent
Degtyarev et al.

(10) Patent No.: US 10,055,023 B2
(45) Date of Patent: *Aug. 21, 2018

(54) MOBILE DEVICE CONTROLLABLE WITH USER HAND GESTURES

(71) Applicant: Mattel, Inc., El Segundo, CA (US)

(72) Inventors: Konstantin Degtyarev, River Edge, NJ (US); Corey Lynn Juliano, New York, NY (US); Matthew Lentini, Astoria, NY (US); Kevin Voorhees, Brooklyn, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,186

(22) Filed: May 8, 2017

(65) Prior Publication Data
US 2017/0308175 A1 Oct. 26, 2017

Related U.S. Application Data

(63) Continuation of application No. 14/499,526, filed on Sep. 29, 2014, now Pat. No. 9,665,179.

(60) Provisional application No. 61/885,248, filed on Oct. 1, 2013.

(51) Int. Cl.
G06F 3/01 (2006.01)
G08C 17/02 (2006.01)
A63H 30/00 (2006.01)
G08C 23/04 (2006.01)
A63H 17/36 (2006.01)

(52) U.S. Cl.
CPC ............ G06F 3/017 (2013.01); A63H 17/36 (2013.01); A63H 30/00 (2013.01); G08C 17/02 (2013.01); G08C 23/04 (2013.01); A63H 2200/00 (2013.01); G08C 2201/32 (2013.01)

(58) Field of Classification Search
CPC .... A63H 17/36; A63H 30/00; A63H 2200/00; G06F 3/017; G08C 23/04; G08C 17/02; G08C 2201/32
USPC ....................................... 340/5.51
See application file for complete search history.

(56) References Cited

U.S. PATENT DOCUMENTS 4,201,012 A 5/1980 Marshall
4,272,916 A 6/1981 Giordano et al.
4,662,854 A 5/1987 Fang
4,987,349 A 1/1991 Nakamura
(Continued)

FOREIGN PATENT DOCUMENTS

WO 2011146254 A2 11/2011

OTHER PUBLICATIONS

International Search Report & Written Opinion from PCT/US2014/058195, dated Jan. 8, 2015.

Primary Examiner — Edwin Holloway, III
(74) Attorney, Agent, or Firm — Edell, Shapiro & Finnan, LLC

(57) ABSTRACT

A mobile device includes a body, at least one drive wheel coupled with the body, a control structure configured to automatically control rotational movements of the at least one drive wheel so as to selectively control movement of the body, and a motion detection system coupled with the control structure and configured to detect a plurality of different movements of a user. The control structure controls rotational movements of the at least one drive wheel to effect different movements of the body based upon different detected movements of the user.

20 Claims, 8 Drawing Sheets

(56) References Cited

U.S. PATENT DOCUMENTS

| | | |
|---|---|---|
| 5,083,968 A | 1/1992 | Hart |
| 5,407,151 A | 4/1995 | Singhal |
| 5,413,518 A | 5/1995 | Lin |
| 5,606,494 A | 2/1997 | Oshima et al. |
| 6,594,844 B2 | 7/2003 | Jones |
| 6,681,150 B1 | 1/2004 | Haga et al. |
| 7,155,308 B2 | 12/2006 | Jones |
| 7,247,076 B2 | 7/2007 | Dang et al. |
| 7,430,455 B2 | 9/2008 | Casey et al. |
| 7,996,111 B2 | 8/2011 | Cheng et al. |
| 8,371,897 B1 | 2/2013 | Wong |
| 8,412,377 B2 | 4/2013 | Casey et al. |
| 9,665,179 B2 * | 5/2017 | Degtyarev .............. G06F 3/017 |
| 2007/0137075 A1 | 6/2007 | Dang et al. |
| 2008/0015738 A1 | 1/2008 | Casey et al. |
| 2008/0177421 A1 | 7/2008 | Cheng et al. |
| 2009/0045766 A1 | 2/2009 | Casey et al. |
| 2009/0055022 A1 | 2/2009 | Casey et al. |
| 2009/0209170 A1 | 8/2009 | Richter |
| 2009/0292393 A1 | 11/2009 | Casey et al. |
| 2010/0062680 A1 | 3/2010 | Giraldez et al. |
| 2011/0143631 A1 | 6/2011 | Lipman et al. |
| 2011/0153081 A1 | 6/2011 | Romanov et al. |
| 2011/0284297 A1 | 11/2011 | Sitarski et al. |
| 2011/0288684 A1 | 11/2011 | Farlow |
| 2012/0312956 A1 * | 12/2012 | Chang .................... G06F 3/017 250/201.1 |
| 2013/0005215 A1 | 1/2013 | Tell et al. |
| 2013/0084765 A1 * | 4/2013 | Pak ........................ A63H 17/00 446/7 |
| 2013/0278398 A1 * | 10/2013 | Smetanin ............... A63H 30/04 340/12.52 |
| 2014/0222253 A1 * | 8/2014 | Siegel .................. B60R 16/037 701/2 |

* cited by examiner

MOBILE DEVICE CONTROLLABLE WITH USER HAND GESTURES

CROSS-REFERENCE TO RELATED APPLICATIONS

This application is a Continuation of U.S. application Ser. No. 14/499,526, entitled "Mobile Device Controllable With User Hand Gestures," filed Sep. 29, 2014, which claims priority to U.S. Provisional Application No. 61/885,248 entitled "Mobile Device Controllable With User Hand Gestures," filed Oct. 1, 2013, the contents of both of which are hereby incorporated by reference herein.

FIELD OF THE INVENTION

The present invention relates to a mobile device including sensors that detect hand gestures of a user and utilize the detected hand gestures to control operations of the mobile device.

BACKGROUND OF THE INVENTION

Various toy devices, such as toy cars or other vehicles, can be user controlled using, e.g., a remote control device that may be hard wired or wireless in relation to the toy device. Such devices, particularly wireless remote control devices, often require power supply (e.g., battery or other electrical power source) for both the toy device and the remote device. In addition, control of such devices can be complicated for users such as small children.

It would be desirable to provide a toy device that is easy to control, particularly for small children.

SUMMARY OF THE INVENTION

In one embodiment, a mobile device includes a body, at least one drive wheel coupled with the body, a control structure configured to automatically control rotational movements of the at least one drive wheel so as to selectively control movement of the body, and a motion detection system coupled with the control structure and configured to detect a plurality of different movements of a user. The control structure controls rotational movements of the at least one drive wheel to effect different movements of the body based upon different detected movements of the user.

In another example embodiment, a method of controlling movements of a mobile device is provided, where the mobile device includes a body, at least one drive wheel coupled with the body, a control structure configured to automatically control rotational movements of the at least one drive wheel, and a motion detection system coupled with the control structure. The method comprises detecting movements of a user via the motion detection system, and, via the control structure, controlling rotational movements of the at least one drive wheel to effect different movements of the body based upon different detected movements of the user.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Although the drawings represent various embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION OF THE INVENTION

A mobile device is configured to be movable based upon hand gestures or other detected movements by a user without the user having to touch any control buttons or devices associated with the mobile device. For example, the user, by making simple hand gestures in relation to the mobile device, can effect movement of the mobile device in one or more directions as well as enable other operations associated with the mobile device.

Figure 1:
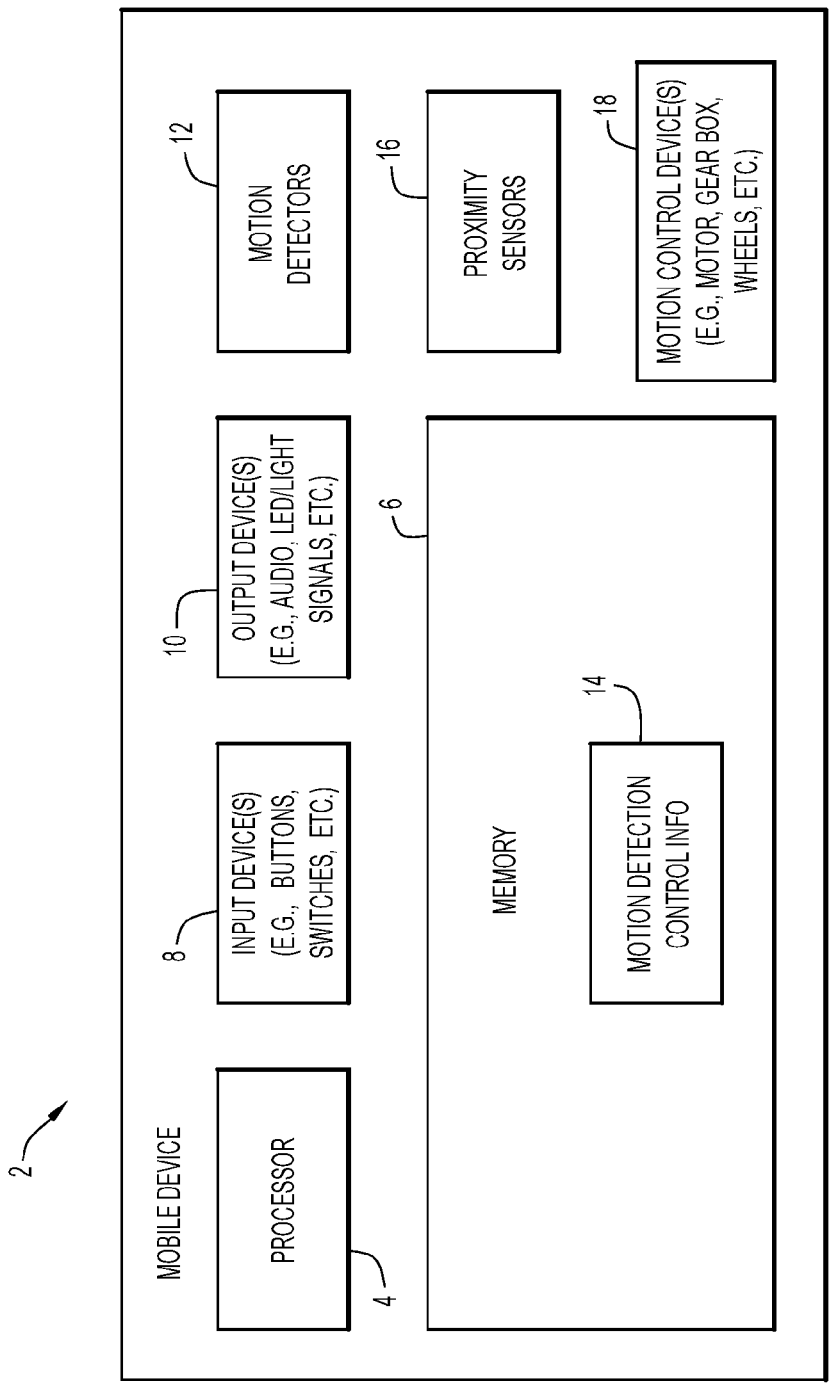
FIG. 1 illustrates a schematic block diagram of an example embodiment of a mobile device that is controllable by user hand gestures or other user movements in accordance with the present invention.

Referring to FIG. 1, an example embodiment of a schematic diagram of a mobile device 2 is presented that includes a controller or processor 4, a memory 6, one or more input devices 8 for facilitating certain user control features as described herein, one or more output devices 10 that provide some form of output (e.g., audio, video, light signals, etc.), motion detectors 12 that facilitate detection of motion by a user (e.g., in the form of hand gestures) to facilitate motion control of the mobile device based upon detected motions and proximity sensors 16 to detect the proximity of oncoming objects or obstacles during movements of the mobile device.

The mobile device 2 further includes one or more motion control devices 18 that control mobility of the mobile device 2. For example, the motion control devices 18 can include a motor coupled with a gear box that controls operation of any one or more drive wheels for the mobile device 2, where the processor 4 controls operation of the motor based upon input control signals detected by the motion detectors 12 (where the input control signals include hand gestures and/or other types of motion by the user as described herein).

The processor 4 can be any suitable microprocessor that is operable to implement electronic operations of the device 2 by executing control process logic instructions that are either integrated as part of the processor 4 or are stored (e.g., as software) within memory 6 of the device 2 and that are accessible by the processor 4. The memory 6 can be implemented by any conventional or other suitable memory storage device, and may include any suitable storage capacity. For example, the memory 6 may comprise computer readable storage media in the form of read only memory (ROM) and/or random access memory (RAM), where the computer readable storage media is further implemented in the form of a physical/tangible memory storage device. The processor 4 and memory 6, as well as electronic circuitry associated with the input and output devices 8, 10 as well as the motion detectors 12, can be implemented on the same or different circuit boards provided in some suitable location within the mobile device 2 (e.g., within a chassis or housing of the device). In some embodiments, the processor 4 and memory 6 as well as other circuitry are implemented within the same integrated circuit package. The memory 6 also stores motion detection control information 14, described in further detail herein.

The one or more input devices 8 for the mobile device 2 can be, e.g., buttons or switches that are configured as power control (e.g., on/off) devices as well as mode control devices that control power as well as different modes of operation for the device. Other types of input devices that facilitate user control of the mobile device are also possible including, without limitation, a keypad, touch pad or touch screen (e.g., a touch screen including icons that are selectable by a user to control operability of the mobile device), a microphone that facilitates audio input by a user, a camera to record still and/or video images of the user, etc.

The one or more output devices 10 can be of any suitable type(s) including one or more speakers to output different sounds, one or more LED or other lights to provide visual indicators, a display (e.g., LCD panel) that provides output still and/or video images during operation of the mobile device 2, etc.

The processor 4 is configured to process input signals that are generated based upon user control/manipulation of the one or more input devices 8 and also control the one or more output devices 10 during operation of the mobile device 2. The processor 4 further receives motion detection control signals detected by the motion detectors 12 and controls operation of the motion control device(s) 18 based upon logic defined by the motion detection control information 14 stored by memory 6. For example, any number of different motion detection control signals can be generated based upon different motions (e.g., hand gestures or other body part movements by a user) detected by the motion detectors 12, and these motion detection control signals can be interpreted by the processor 4 to control the motion control devices 18 to effect movements of the mobile device. Different types of movements that can be controlled include, without limitation, forward movements, reverse movements, left and right turning movements, initiating movement, ceasing movement and controlling speed of movement of the mobile device 2. In addition, motion detection control signals can be generated based upon different motions detected by motion detectors 12 and/or different user selected modes of operation to effect control, via the processor 4, of a series of pre-programmed movements, sounds and/or other types of output by the mobile device 2.

The motion detectors 12 and proximity sensors 16 can be any suitable types of detection mechanisms or sensors disposed at any suitable one or more locations in relation to the mobile device 2 that facilitate detection of moving or still objects in proximity to the sensors. In an example embodiment, motion detection and/or proximity sensors can be configured as infrared (IR) light emitters (also referred to herein as IR emitters) and one or more IR light detection sensors (also referred to herein as IR detection sensors), where reflected light by IR emitters is detected by the one or more IR detection sensors to detect an object in proximity to the IR emitters and IR detection sensor(s) as well as types of movements of the object.

Figure 2:
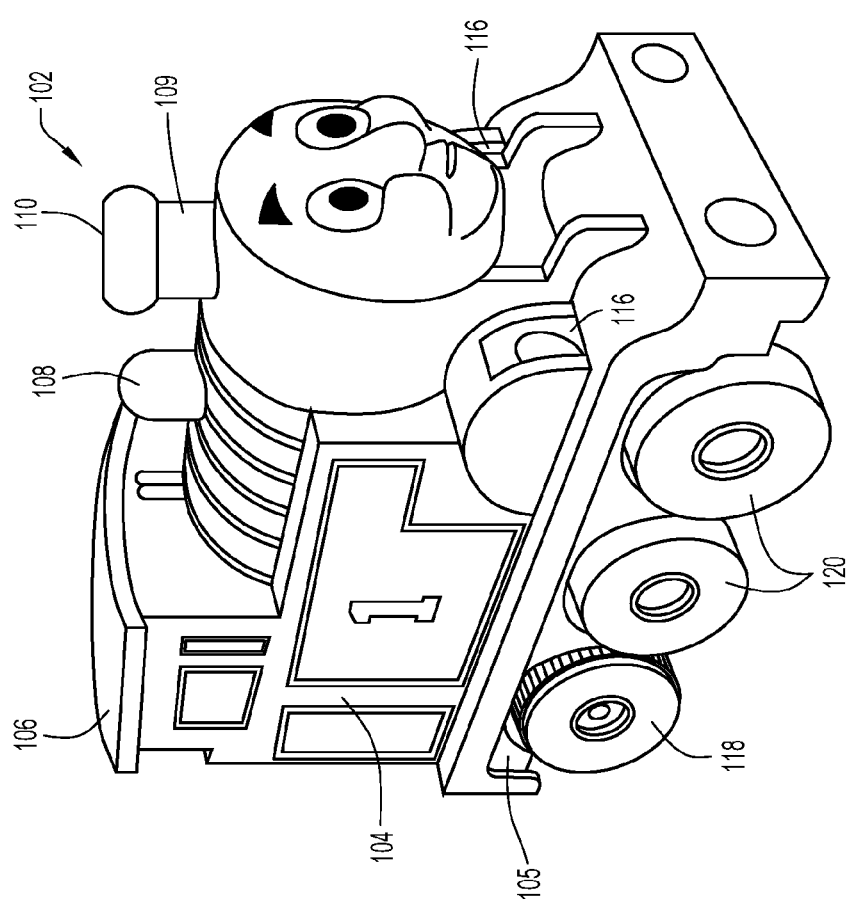
FIG. 2 is a front view in perspective an example embodiment of the mobile device of FIG. 1 implemented as a toy train device.

An example embodiment of a mobile device 2 including the features as depicted schematically in FIG. 1 is now described as a toy train 102 depicted in FIGS. 2-7. It is noted that a toy train is depicted for example purposes only, and the features of the present invention can be implemented in a mobile toy device having any suitable design including, without limitation, a toy car, a toy truck, a toy airplane, a mobile toy action figure, etc. Referring to FIG. 2, a toy train 102 includes a central main body section 104, a generally rectangular shaped roof section 106 connected at a top end of the body section, and a carriage section 105 connected at a lower end of the main body section 104 that includes wheels 118, 120 which support the toy train 102 on a surface upon which the train traverses during operation. While the main body section, roof section and carriage section are depicted as separate components, it is noted that the toy train can be configured such that these sections are integrated as a single component (e.g., molded as a single component). These sections (and also components associated with these sections) can be constructed of any suitably rigid materials including, without limitation, hard plastic materials, metal materials, etc. The main body section 104 and/or other sections of the toy train 102 can include any suitable indicia that enhances the aesthetic look and feel of the toy train for operation by users of young ages (e.g., providing a design of a face on a front surface portion of the toy train, numbers, lettering or any other suitable indicia on the sides surface portions and/or any other surface portions of the main body section and/or other sections to provide the look and feel of a train for the user).

The toy train 102 includes a smoke stack 109 and a control button 108 that extend from a top portion of the main body section 104. The control button 108 can be depressible in a direction toward the main body section 104 to allow a user to change modes of operation of the toy train device 102 as described herein. In particular, the control button 108 can be suitably biased outward and away from the main body section 104, where the user can push the control button 108 toward the main body section 104 against the bias of the button 108 to engage suitable control circuitry which changes the mode of operation of the toy train device 102 from a current mode to another mode. When the user disengages the push force applied to the control button 108, the control button 108 is biased back to its original position.

Figure 3:
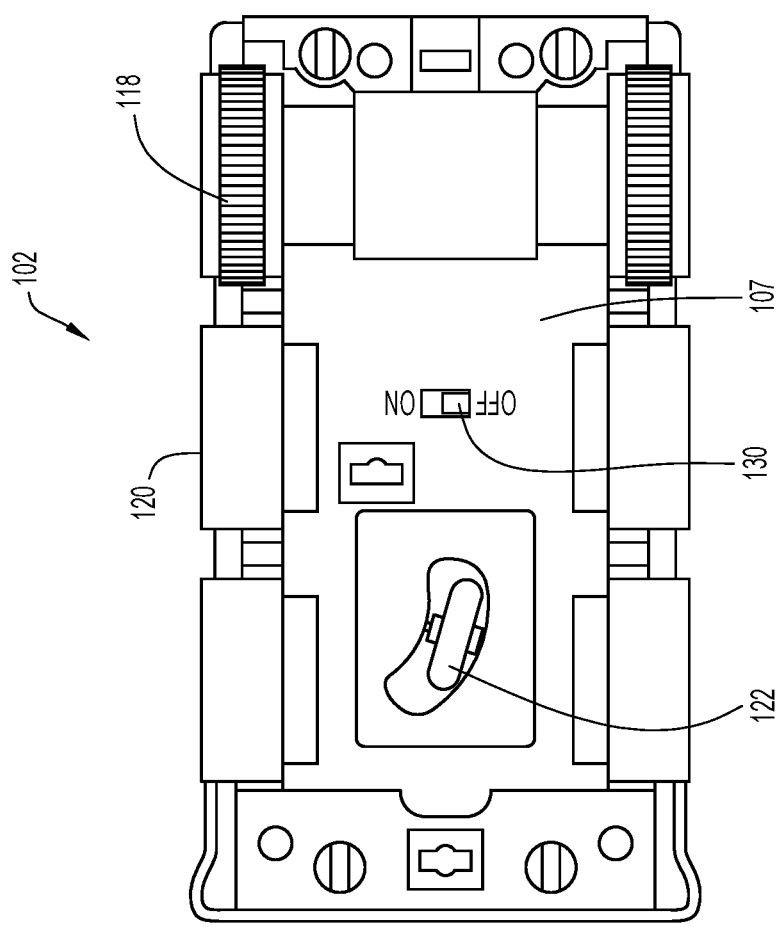
FIG. 3 is a bottom view in plan of the toy train device of FIG. 2.
Figure 6:
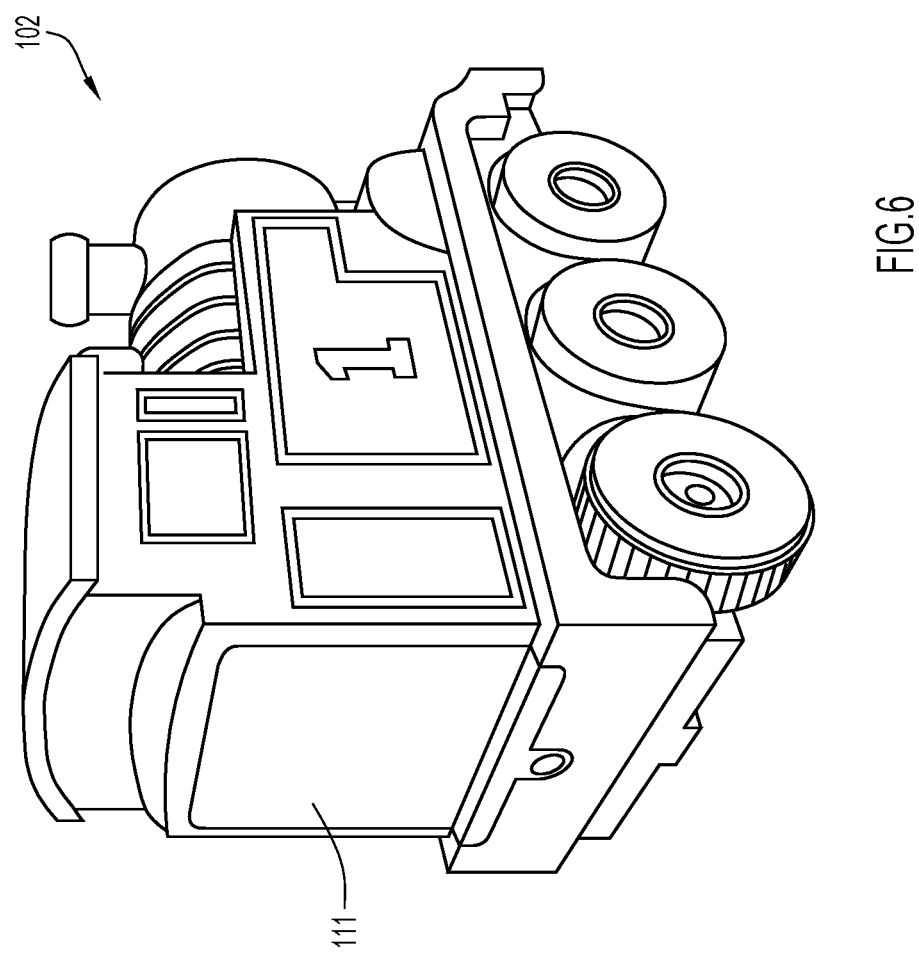
FIG. 6 is a rear view in perspective of the toy train device of FIG. 2.
Figure 7:
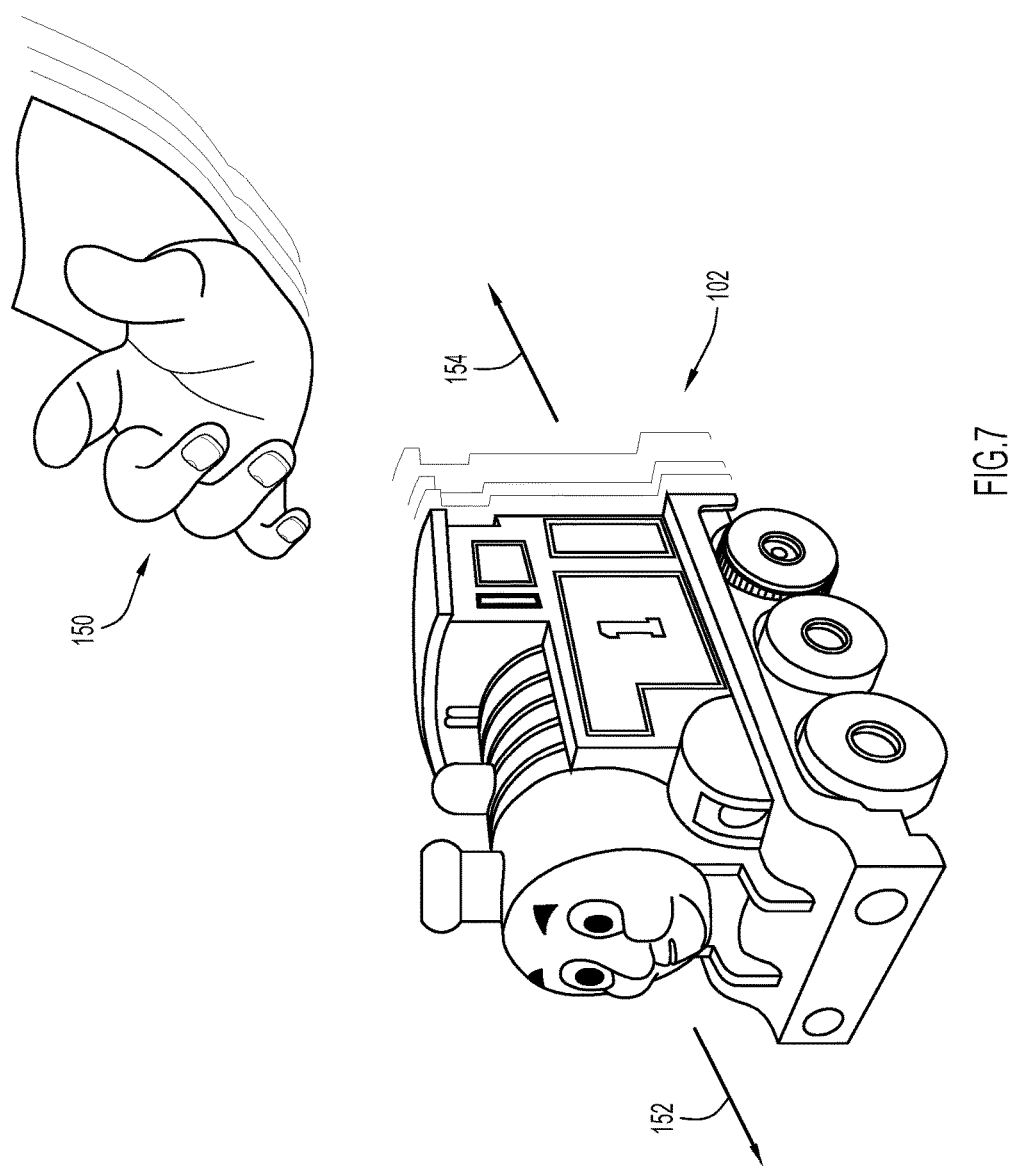
FIG. 7 is a view in perspective of the toy train device of FIG. 2 which demonstrates movements of the toy train device based upon user hand gestures.

Disposed on a bottom surface 107 of the carriage section 105, as depicted in FIG. 3, is an on/off control (e.g., toggle) switch 130 that can be controlled by the user to turn the toy train 102 on and off. The control switch 130 selectively provides electrical power to the circuitry that controls operation of the toy train 102. The toy train 102 can be powered by any suitable one or more types of batteries, where a battery storage location can be provided within the main body section 104 (e.g., where the battery storage location may be accessed via a compartment door 111 disposed at a rear end of the main body section 104 as depicted in FIG. 6). Alternatively, the toy train 102 can be powered by any other suitable electrical power source (e.g., solar powered, via electrical power cord that connects with a power supply source, etc.).

Also disposed on the bottom surface 107 of the carriage section 105 is a pair of drive wheels 118 that are powered by a motor disposed within the main body section 104 and/or carriage section 105 (e.g., part of the motion control device 18 as depicted in the schematic block diagram of FIG. 1).

The drive wheels 118 can be located at or near a rear end of the carriage section 105 (i.e., the rear end of the carriage section corresponds with the rear end of the toy train). Optionally, additional wheels 120 (e.g., two pairs of wheels 120 as depicted in FIG. 3) can also be provided at one or more suitable locations along the bottom surface 107 of the carriage. The additional wheels 120, while not connected with the motor, can assist in movement of the toy train 102 when the drive wheels 118 are powered by the motor. In addition, the drive wheels can be provided at other suitable locations in relation to the bottom surface 107 of the carriage section 105 (e.g., to provide front wheel drive, rear wheel drive, four or all wheel drive, etc.) based upon a particular design required for the toy train. The drive wheels and additional wheels are located near the longitudinal or lengthwise sides of the carriage section 105 and are thus visible when the toy train 102 is placed upon a support surface (as indicated, e.g., by FIG. 2) A caster wheel 122 is also provided at the bottom surface 107 of the carriage section 105. The caster wheel 122 is located near a front end of the carriage section 105 (which corresponds with the front end of the toy train 102) and is disposed within an arcuate shaped groove located along the bottom surface 107 at approximately a central location between the two lengthwise sides of the carriage section 105. The caster wheel is configured to assist in turning movements of the toy train 102 during operation of the train as described herein.

An electric motor is activated and operable via the processor 4, where the processor 4, memory 6 and related electrical wiring/circuitry is disposed within one or both of the main body section 104 and carriage section 105. In addition, a gear box (also provided within the main body section and/or carriage section) can be coupled with the motor and drive wheels 118, where the motor can be controlled via the processor 4 to operate so as to rotate an output shaft in a first (e.g., clockwise) direction and a second (e.g., counterclockwise) direction. The gear box includes suitable gearing structure that can also be controlled by the processor 2 so as to selectively couple rotational forces of the motor output shaft to a drive axle associated with one or both of the drive wheels 118 (thus facilitating selective rotation of one or both drive wheels 118 in clockwise or counter clockwise movements and at selected rotational speeds) based upon a given mode of operation.

Figure 4:
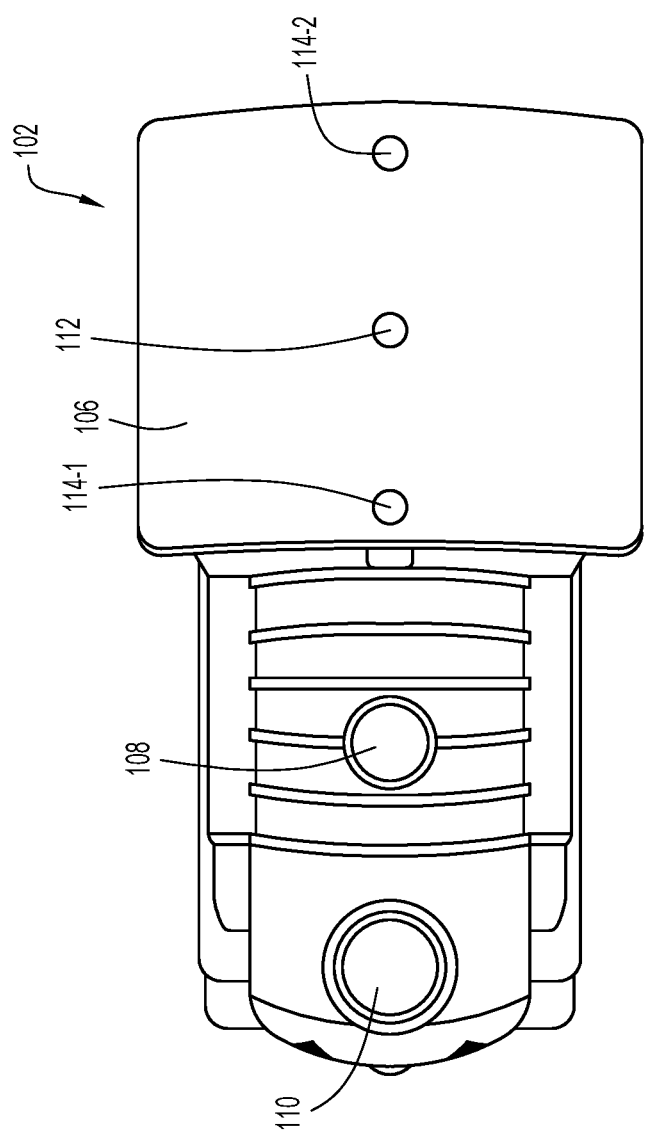
FIG. 4 is a top view in plan of the toy train device of FIG. 2.
Figure 8:
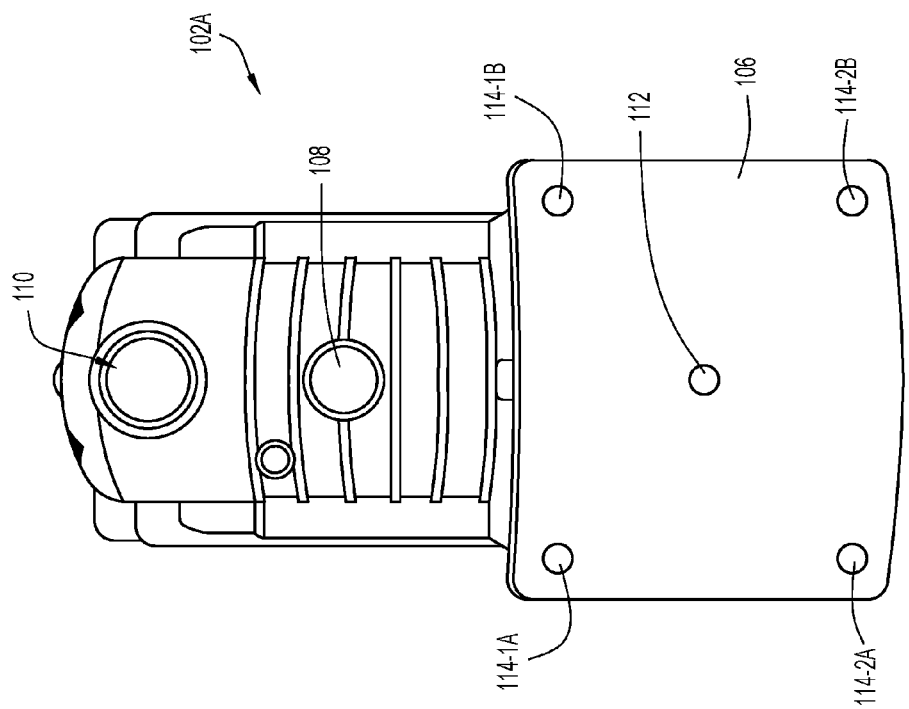
FIG. 8 is a top view in plan of an alternative example embodiment of a toy train device in relation to the toy train device of FIG. 2.

Referring to FIG. 4, motion detectors 12 are implemented with the toy train 102 in the following manner. Two IR (infrared) emitters 114 are located on an upper surface of the roof section 106 at separated distances from each other. A first emitter 114-1 is disposed near one lengthwise end of the roof section 106 that extends toward the front end of the toy train 102, while a second emitter 114-2 is disposed near an opposing lengthwise end of the roof section 106 that extends toward the back or rear end of the train 102. An IR sensor 112 is disposed between the two IR emitters 114. In the example embodiment of FIG. 4, the IR sensor 112 and IR emitters 114 are oriented along an imaginary line that extends lengthwise at approximately a center location of the roof section 106. However, it is noted that the IR emitters and IR sensor can be provided at any other suitable locations that facilitate operations of the toy train 102 as described herein. In addition, while the embodiment of FIGS. 2-7 depict two IR emitters and a single IR sensor, it is noted that any other number and configuration of IR emitters and IR sensors can also be provided at different locations along the roof section and/or any other suitable sections of the toy train (e.g., another configuration of IR emitters and IR sensor is depicted in FIG. 8), provided that at least two IR emitters are provided at suitable distance from each other and in sufficient proximity to an IR sensor that can detect reflected IR light emitted by each IR emitter.

In addition, and as depicted in FIG. 4, the IR sensor 112 and IR emitters 114 are disposed such that the detection surface or area of the IR sensor and the emission surface or area of each IR emitter are within the same plane or in any other suitable configurations such that, during emission of an IR signal from any IR emitter 114, the IR sensor 112 cannot detect IR light from such IR emitter 114 unless the IR light has been reflected toward the IR sensor 112. Movement of a user's hand or other body part, for example, across a beam of IR light generated by an IR emitter 114 would result in reflection of the IR light signal from the IR emitter 114 in a direction toward and that is detectable by the IR sensor 112. If IR light from an IR emitter 114 has not been reflected in any manner within a certain proximity of the IR sensor 112 and/or IR emitter 114 (e.g., within 0.5 meter or less, preferably 0.25 meter to 0.30 meter, in distance from the IR sensor and/or IR emitter), the IR sensor 112 cannot detect the IR signal from the IR emitter 114. Thus, the user must reflect the IR signal from an IR emitter 114 (e.g., by waving the user's hand or other body part over the IR emitter 114) at a distance that is within a predefined range of detection for the IR sensor 112 (e.g., within 0.5 meter or less in distance from an IR emitter, preferably a distance of 0.25 meter to 0.30 meter from an IR emitter).

During operation, each IR emitter 114-1, 114-2 emits a modulated IR signal of light that is different from a modulated IR signal of light emitted by the other IR emitter. Thus, IR light that is reflected from IR emitter 114-1 or IR emitter 114-2 and detected by IR sensor 112 can be identified as corresponding with that specific IR emitter. The IR sensor 112 is coupled with the electrical circuitry associated with the processor 4 and memory 6 and, when detecting an IR signal that has been reflected from any IR emitter 114, provides a specific electrical signal for use by the processor 4 that corresponds with the specific modulated IR signal associated with the specific IR emitter 114-1 or 114-2. Thus, when a user reflects the IR signal emitted from IR emitter 114-1 back toward IR sensor 112 (e.g., by waving the user's hand or other body part across IR emitter 114-1), the IR sensor 112 detects a reflected IR signal and provides an electrical signal for processing by the processor 2 that corresponds with the specific IR sensor 114-1. A similar result occurs when the IR sensor 112 detects a reflected IR signal from IR sensor 114-2, where the electrical signal provided by the IR sensor 112 corresponds with the specific IR sensor 114-2.

By placing the IR emitters 114-1 and 114-2 at separate locations from each other, in combination with each IR emitter emitting a different modulated IR signal (where the IR sensor 112 detects the different IR signals of the IR emitters 114 and distinguishes between the IR emitters by providing different electrical signals associated with the different detected IR signals), hand gestures or other movements by the user in relation to the IR emitters 114 can be used to control movements and other operations of the toy train 102. In particular, in response to movement of a user's hand in a particular direction over the roof section 106 such that both IR emitters 114-1, 114-2 reflect IR light at their corresponding modulation signals, the IR sensor 112 is capable of detection of this hand gesture or movement in the particular direction based upon the sequence of detection of reflected IR signals emitted by the IR emitters.

For example, a movement of the user's hand or other body part in close proximity over the roof section 106 from a rear portion toward a front portion of the toy train 102, such that the user's hand or other body part moves first over the IR emitter 114-2 and subsequently or second over IR emitter 114-1 within a certain time interval (e.g., no more than 1-2 second interval between the detection of the reflected IR signals from both IR emitters), results in detection of reflected IR light associated with IR emitter 114-2 first by IR sensor 112 and then detection of reflected IR light associated with IR emitter 114-1 second by IR sensor 112. In response to this sequence of detection of reflected IR signals (i.e., detection of reflected IR signals first by IR emitter 114-2 and then by IR emitter 114-1) by the IR sensor 112 results in one or more electrical signals provided by the IR sensor 112 that can be utilized by the processor 4 to control operation of the motor and corresponding rotational movements of one or both drive wheels 118 to achieve a forward movement of the toy train 102.

A similar type of movement of the user's hand or other body part over the roof section 106 but in an opposite direction (e.g., from front to rear of the toy train 102) such that the IR sensor 112 detects a reflected IR signal from IR emitter 114-1 first and subsequently or second detects a reflected IR signal from IR emitter 114-2 within a certain time interval (e.g., no more than 1-2 second interval between the detection of the reflected IR signals from both IR emitters), results in the IR sensor providing one or more electrical signals that can be utilized by the processor to control operation of the motor and corresponding movement of one or both drive wheels 118 to achieve reverse movement of the toy train 102.

Other coordinated movements of the user's hand/other body part in relation to the IR emitters 114 can result in different reflected IR signals and in different sequences that are detected by the IR sensor 112, resulting in one or more corresponding electrical signals being provided for use by the processor 4 to control pre-programmed or other operations of the toy train 102, such as the example types of operations described herein.

The processor 4 utilizes the electrical signals provided by the IR sensor 112 to control operations of the motor and/or gear box, which in effect controls rotational motions of one or both of the drive wheels 118, based upon control logic stored in memory 6 as the motion detection control information 14. For example, the motion detection control information 14 can comprise a look up table or other suitable data configuration in which specific electrical signals (or sequences of electrical signals) provided by the IR sensor 112 (and which are generated based upon specific hand/body part gestures of the user in relation to the roof section 106 of the toy train 102) correspond with specific motion control and/or other operations to be performed as controlled by the processor 4.

Examples of different control operations include: forward movement of the toy train 102 (based upon the user waving hand/body part over IR emitter 114-2 first followed by waving hand/body part over IR emitter 114-1 within a specified sequence interval) and backward or rear movement of the toy train 102 (based upon the user waving hand/body part over the IR emitter 114-1 first followed by waving hand/body part over IR emitter 114-2 within a specified sequence interval). The processor 4 can also control output device(s) 10 to output audio, video, light signals, etc. that correspond with such control operations. For example, an output device 10 of the toy train 102 can include one or more audio speakers, such as an audio speaker 110 provided within the toy smoke stack 109, where pre-recorded audio sounds (saved by memory 6) are output in correspondence with the different control operations (e.g., the sound of a moving train output by the audio speaker during forward or reverse movement of the toy train 102 with the drive wheels 118). Similarly, any number of lights (e.g., headlights for the toy train 102), video displays (e.g., a video screen display at a front end of the train that displays pre-programmed still and/or moving images), etc. can also be provided as output devices 10 controlled by the processor to enhance output features associated with controlled movement and other operations of the toy train 102.

As previously noted, while the embodiment depicted in FIGS. 2-7 depicts a toy train with two IR emitters 114 and one IR sensor 112, the present invention is not limited to this embodiment. In alternative embodiments, any suitable number of IR emitters (e.g., 3 or more) and any suitable number of IR sensors (e.g., 2 or more) can be provided to control a variety of different types of movements (e.g., based upon specific sequences of different reflected IR signals by the IR emitters as detected by the IR sensor).

Another example embodiment of a toy train 102A is depicted in FIG. 8, in which four IR emitters 114-1A, 114-1B, 114-2A and 114-2B are provided on the roof section 106 of the toy train, where each IR emitter 114 emits a different modulated IR signal that can be detected by the IR sensor 112 and recognized as corresponding with the specific IR emitter. The IR emitters are positioned such that the two IR emitters 114-1A, 114-1B are disposed on the roof section 106 closer to the front side of the train 102A, while the other two IR emitters 114-2A, 114-2B are disposed on the roof section 106 closer to the back or rear side of the train 102A. Each of the sensors 114 is located at a corner of the generally rectangular shaped roof section 106. Such placement allows for hand/body part gestures of the user in selected sequences over two or more IR emitters to control a number of different movements, such as: combined forward and left turning movements (e.g., by waving the user's hand over IR emitter 114-1B and then over IR emitter 114-1A within a selected time interval), combined forward and right turning movements (e.g., by waving the user's hand over IR emitter 114-1A and then over IR emitter 114-1B within a selected time interval), combined backward and left turning movements (e.g., by waving the user's hand over IR emitter 114-2B and then over IR emitter 114-2A within a selected time interval), and combined backward and right turning movements (e.g., by waving the user's hand over IR emitter 114-2A and then over IR emitter 114-2B within a selected time interval), where all movements are achieved in a manner similar to that described in the embodiment of FIGS. 2-7 (e.g., processor 4 controls operation of drive wheels 118 and/or other output devices 10 during different modes of operation and/or based upon different electrical signals received from IR sensor 112 that correspond with different sequences of detected IR signals from the IR emitters 114).

Control button 108 can be depressed by the user to control different modes of operation for the toy train 102. For example, in a first mode of operation, detection by the IR sensor 112 of reflected IR signals from different IR emitters 114 results in forward and reverse movements, based upon the IR emitters to which the user's hand/body part is moved over. In another mode of operation, detection of reflected signals from different IR emitters 114 can result in different pre-programmed operations performed by the toy train 102, based upon control by the processor 4 based upon processing of electrical signals provided by the IR sensor 112 that correspond with instructions for the pre-programmed operations saved as part of the motion detection control information 14 by memory 6.

In one example mode of operation, a pre-programmed operation can be initiated by the processor 4 based upon back-and-forth hand/body part movements of the user across both IR emitters 114-1 and 114-2. For example, the user might wave his or her hand at a suitable distance (e.g., within 0.5 meter, preferably within 0.25-0.30 meter) from the roof section 106 and in a direction from front-to-back and back-to-front in a continuous manner and in relation to the toy train 102 such that IR emitters 114-1 and 114-2 are alternately traversed, resulting in an alternating reflection of different IR signals by these IR emitters. As a result of such movements, the IR sensor 112 senses the alternating reflected IR signals and provides one or more corresponding electrical signals associated with such reflected IR signals to the circuitry for processing by the processor 4. The one or more electrical signals, when identified using the motion detection control information 14, results in the processor 4 controlling one or more output devices, such as audio speaker 110, to output sounds and/or other information to the user indicating that motion of the toy train 102 is imminent.

A number of detected back-and-forth movements can be monitored by the processor 4 so as to control an operation of the toy train 102 in response to a certain number of detected IR signals reflected from the IR emitters 114. Alternatively, or in combination with monitoring the number of back-and-forth movements (i.e., monitoring the number of alternating IR signals by the IR sensor 112), the time at which electrical signals from the IR sensor 112 alternate (which is an indication of how fast the user is moving his or her hand/body part back-and-forth traversing the path of the IR signal emitted by the IR emitters 114) can also be monitored using the processor 4 and used to establish a time at which the motor and drive wheels 118 are activated and/or a speed at which the motor operates and the toy train 102 correspondingly moves.

For example, in this selected mode of operation, the motor and drive wheels 118 may initially be non-active such that the toy train 102 is stopped (not moving) and the processor 4 may control operation such that an audio command (stored as a pre-programmed message within memory 6) is output by the audio speaker 110 (e.g., "WAVE YOUR HAND QUICKLY OVER MY TOP, AND I WILL GO FAST!"). Other audio sounds can also be output (e.g., a chugging sound of a train engine that increases as the user increases the back-and-forth speed of hand waving past the IR emitters 114). When a selected number of detected back-and-forth movements of the user's hand/body part over the roof section 106 of the toy train 102 has occurred (as detected by change in detection of different reflected IR signals by the IR sensor 112), the motor is activated by the processor 4, causing one or both drive wheels 118 to rotate resulting in movement (e.g., forward movement) of the toy train 102. In this embodiment, two users can play a game to compete in a race against each other, where each user has his or her own toy train 102 in the same mode of operation setting and each user races to see who can get their toy train 102 to move first and/or the fastest (based upon how quickly each user moves his or her hand over the top of their toy train so as to reach the selected number or count of detected IR signals reflected in an alternating manner by IR emitters 114-1 and 114-2).

It is noted that any suitable number and/or types of modes of operation can be programmed for the toy train 102. Providing additional IR emitters 114 and/or IR sensors 112 can also facilitate more enhanced or controlled types of movements (e.g., as previously noted, providing the 4 IR emitters 114 at the locations depicted in FIG. 8 facilitates more precisely controlled movements by user hand/body part gestures, such as forward left, forward right, reverse left, reverse right, etc.).

When motion is initiated via user hand/body part gestures, controlled forward or reverse movement of the toy train 102 can be implemented (via control by processor 4 of the motor which controls drive wheels 118) for a select period of time (e.g., for about 10 seconds or less). Alternatively, or in addition to the select period of time in which controlled movement is performed, the toy train 102 can continue to move in a certain direction until an obstacle is encountered. In particular, the toy train 102 can be provided with proximity sensors that are configured to detect approaching objects (e.g., a wall, a chair or other piece of furniture, etc.) that may be obstructing the travel path of the moving train and take evasive movements to divert the motion of the train so as to prevent or minimize impact with such objects.

Figure 5:
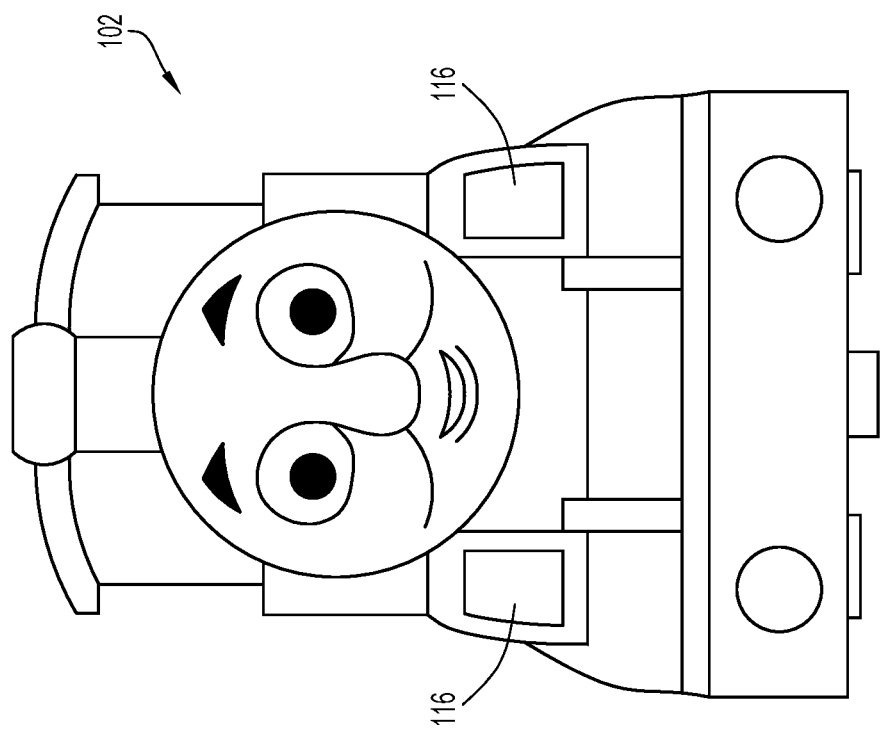
FIG. 5 is a front view of the toy train device of FIG. 2.

Referring to FIGS. 2 and 5, the toy train 102 includes proximity sensors 116 located at a front end of the main body section 104. The example embodiment depicts two proximity sensors 116 located at the front end and adjacent or proximate each side of the toy train 102 which are configured to detect approaching obstacles from the left or right side at the front end of the train as the train is moving in the forward direction. However, it is noted that the toy train 102 can include proximity sensors 116 provided at any other suitable locations (e.g., at the rear end of the train to detect approaching obstacles when the train is moving in reverse) to facilitate enhanced motion control and initiation of evasive movements to avoid or minimize impact with obstacles in the path of motion of the train.

Each proximity sensor 116 includes an IR emitter that emits an IR signal and an IR sensor that is configured to sense IR light reflected from an obstacle located at a selected distance (e.g., within 20 cm or less) from the location of the proximity sensor 116 and front end (right and/or left side) of the toy train 102. The proximity sensors 116 are connected via suitable circuitry with the processor and provide different electrical signals in response to detection of reflected IR light such that an obstacle can be detected at one or both of the left front side and right front side of the toy train 102 as the train is moving in the forward direction. The motion detection control information 14 stored by memory 6 includes control algorithms utilized by the processor 4 to control the motor, gear box and drive wheels 118 to either cease operation (resulting in the train ceasing movement) or effect evasive maneuvers by the toy train when traveling in the forward direction based upon detection of approaching obstacles by the proximity sensors 116.

For example, assume a scenario in which the toy train has been activated based upon user hand gestures and is moving in a forward direction. When an obstacle is detected as approaching at the left hand front side of the train (based upon detection by the proximity sensor 116 at the left hand front side of the main body portion 104), the processor 4, utilizing a control algorithm stored in memory 6 (e.g., as part of the motion detection control information 14) can control the motor and/or gear box to control rotational movements of the drive wheels 118 to stop forward movement and/or make a turn of the train (e.g., to the right) and/or initiate a reverse movement of the train in an attempt to avoid the obstacle. Similarly, when an obstacle is detected as approaching at the right hand front side of the train (based upon detection by the proximity sensor 116 at the right hand front side of the main body portion 104), the processor 4 can control the motor and/or gear box in a similar manner to control rotational movements of the drive wheels 118 to stop forward movement and/or make a turn of the train (e.g., to the left) and/or initiate a reverse movement of the train in an attempt to avoid the obstacle. When both the left and right hand side proximity sensors 116 detect an obstacle, the processor 6 (using a control algorithm stored in memory 6) can control the motor and/or gear box to stop movement of the toy train altogether (or, alternatively, cause the train to move in a reverse direction).

One control algorithm that may be utilized by the processor 4 in this scenario is to control the motor and gear box such that right side drive wheel 118 is rotated in a reverse direction and the left side drive wheel 118 is rotated in a forward direction that opposes the reverse direction of the right side drive wheel 118. Such opposing rotational motions of the drive wheels 118 and also the action of the caster wheel 122 results in a turning motion of the front end of the toy train 102 to its right in an attempt to avoid the obstacle. After activating the drive wheels 118 in opposing directions in this manner for a select time period, the toy train will have turned a selected angle from its previous forward position, and the drive wheels 118 can then be controlled to again control forward movement of the toy train 102. When obstacles are again encountered, similar evasive actions can be taken to control turning movements to the left or to the right and/or in reverse in an attempt to free the toy train 102 from encountering the obstacle when it continues with its forward movement. As previously noted, similar types of proximity sensors can also be provided at a rear end of the toy train to detect and attempt to avoid obstacles approaching within the path of travel when the toy train is moving in reverse.

Operation of the toy train 102 is now described with reference to FIGS. 1-7. Initially, a user (e.g., a toddler or small child) activates the train by turning the power switch to the "on" position, which activates the control circuitry disposed within the main body section 104, including processor 4. Optionally, in response to initial activation, the processor can control the audio speaker 110 (and/or other output devices 10) to provide an indication that the toy train is powered up and/or provide instruction to the user (e.g., an audio output of "HELLO", "PLEASE CHOOSE A PLAY MODE", providing train whistle or other train sounds, etc.). The control features may be set to an initial start-up mode in which the user simply provides suitable hand/body part gestures over the roof section 106 to initiate movement of the train. Alternatively, the user chooses a play mode by engaging control button 108 a selected number of times (e.g., once, twice, etc.) depending upon the number of play modes programmed for the toy train 102. At each play mode selection, the processor can optionally control the audio speaker 110 (and/or other output devices 10) to provide an indication of the particular play mode selected.

In one play mode, the user moves his or her hand/body part in a selected gesture and corresponding selected sequence over the IR emitters 114-1, 114-2 to selectively control forward or reverse movement of the toy train 102 based upon the user's hand gestures in relation to the IR emitters 114 as previously described herein (i.e., the IR sensor 112 detects reflected IR signals that correspond with a specific IR emitter 114-1, 114-2 and in specific sequences, and specific electrical signals are provided to the control circuitry that are utilized by the processor 4 to control operation of the motor, gear box and drive wheels 118 to effect corresponding forward or reverse movement of the toy train 102). For example, referring to FIG. 7, a movement of the user's hand 150 in a forward direction (as indicated by arrow 152) over the roof section 106 and IR emitter 114-2 and IR emitter 114-1 (in that specific sequence and at a select time interval) results in a forward movement of the toy train 102 (as indicated by arrow 152). Similarly, a movement of the user's hand 150 in a reverse direction (as indicated by arrow 154) over the roof section 106 and IR emitter 114-1 and IR emitter 114-2 (in that specific sequence and at a select time interval0 results in a reverse movement of the toy train 102 (as indicated by arrow 154).

During forward movement, in response to a detection by at least one IR emitter/sensor 116 of an approaching obstacle, the processor 4 controls the motor, gear box and drive wheels 118 in an attempt to take one or more evasive maneuvers (e.g., by controlling drive wheels 118 to move in opposing rotational directions so as to effect a turn of the toy train 102 with the assistance of the caster wheel 122, or to stop motion of the toy train 102 altogether). The forward or reverse movement of the toy train 102, which was initiated based upon the user's hand/body part gestures, continues for a select period of time (e.g., 10 seconds) and/or until the user initiates a different movement based upon further hand/body part gestures above the roof section 106 of the toy train 102.

The user can select another mode of operation by engaging the control button 108 (where, in response, the processor 4 can initiate another audio output from speaker 110 that identifies the new mode selected by the user and/or instructs the user to take a certain action). For example, a second mode of operation can be a "race" feature as previously described herein, where the user waves his or her hand/body part in a fast back-and-forth manner and as quickly as possible between the IR emitters 114-1 and 114-2, making sure to cross the IR signal path of each IR emitter 114, where movement and/or speed of the train is initiated and controlled based upon how quickly the user can move their hand/body part in the back-and-forth manner (e.g., movement of the train 102 is initiated in response to a specific number of detections by IR sensor 112 of alternating IR signals reflected by IR emitters 114-1, 114-2).

Any other modes of operation can be programmed and stored within memory 6 (e.g., as part of the motion detection control information 14) for use by the processor 4 to control movements of the toy train 102 and/or output features (e.g., audio output, video output, light signal output, etc.) associated with the train.

Thus, the mobile device (e.g., implemented as a toy train or any other type of mobile vehicle or toy) can be moved by hand and/or body part gestures by a user, where the user does not need to touch any portion of the mobile device to control its movement or other operational features. This renders the mobile device very simple to use by a toddler or young child and can further be used to help with a child's coordination in controlling movement by waving a hand or body part over selected portions of the mobile device in one or more selected directions.

While the example embodiments of a mobile device (as depicted in FIGS. 2-8) have been described, it is noted that the present invention is not limited to this specific configuration but instead can be implemented by any suitable mobile with corresponding components as described in the general schematic block diagram embodiment of FIG. 1.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration.

Further, terms such as "first," "second," "third," etc., merely identify one of a number of portions, components and/or points of reference as disclosed herein, and do not limit the present invention to any particular configuration or orientation.

Therefore, although the disclosed inventions are illustrated and described herein as embodied in one or more specific examples, it is nevertheless not intended to be limited to the details shown, since various modifications and structural changes may be made therein without departing from the scope of the inventions. Further, various features from one of the embodiments may be incorporated into another of the embodiments. Accordingly, it is appropriate that the invention be construed broadly and in a manner consistent with the scope of the disclosure.

What is claimed:

1. A mobile device comprising:
   a body;
   at least one drive wheel coupled with the body;
   a control structure configured to automatically control rotational movements of the at least one drive wheel so as to selectively control movement of the body; and
   a motion detection system coupled with the control structure and configured to detect a plurality of different movements of a user, the motion detection system including:
      a plurality of sensor elements, wherein each sensor element is positioned on a different portion of the body; and
      a detector configured to detect different movements of the user based upon a detected characteristic of the sensor elements with respect to the movements of the user,
   wherein different movements of the user detected by the motion detection system comprise hand or body part gestures by the user in which the user moves a hand or body part in one or more directions at a selected distance from a selected portion of the body of the mobile device and in a selected sequence over at least two sensor elements, and wherein the control structure controls rotational movements of the at least one drive wheel to effect different movements of the body of the mobile device based upon different detected movements of the user.

2. The mobile device of claim 1, wherein the plurality of sensor elements is a plurality of IR (infrared) emitters, wherein each IR emitter emits an IR signal of light that is different from an IR signal of light emitted by every other IR emitter; and
   wherein the detector is an IR detector configured to detect different IR signals emitted by the IR emitters and that are reflected from a travel path of emission of the IR signals by the IR emitters.

3. The mobile device of claim 2, wherein the control structure comprises:
   memory including control instructions; and
   a processor configured to utilize the control instructions stored within memory and electric signals provided by the IR detector to control rotational movements of the at least one drive wheel and corresponding movements of the body of the mobile device, wherein the electric signals provided by the IR detector correspond with detection of different reflected IR signals.

4. The mobile device of claim 1, wherein the control structure comprises:
   memory including control instructions; and
   a processor configured to utilize the control instructions stored within memory and electric signals provided by the detector to control rotational movements of the at least one drive wheel and corresponding movements of the body of the mobile device, wherein the electric signals provided by the detector correspond with detection of different movements of the user.

5. The mobile device of claim 1, wherein the different movements of the user result in the control structure effecting different movements of the body of the mobile device that comprise at least two of: forward movement of the body, reverse movement of the body, combined forward and left movement of the body, combined forward and right movement of the body, combined reverse and left movement of the body, and combined reverse and right movement of the body.

6. The mobile device of claim 1, further comprising one or more proximity sensors disposed at least one of on a front end of the body of the mobile device and on a rear end of body of the mobile device, wherein the one or more proximity sensors effect a change of movement of the body of the mobile device via control of the at least one drive wheel in response to detection of an obstacle at a selected distance from the one or more proximity sensors.

7. The mobile device of claim 1, further comprising one or more output devices comprising at least one of an audio output device, a video output device and a light emission output device, wherein the control structure is further configured to control the one or more output devices to provide different outputs based upon different controlled movements imparted to the body of the mobile device.

8. The mobile device of claim 1, further comprising at least one input device that is operable by the user to change operation of the mobile device, via control of rotational movements of the at least one drive wheel by the control structure and based upon detected movements of the user, from one mode of operation to another mode of operation.

9. The mobile device of claim 1, further comprising a first drive wheel and a second drive wheel, wherein the control structure is configured to control rotational movements of the first drive wheel and the second drive wheel such that, in a first mode of operation, the first and second drive wheel are rotated together in a same direction and, in a second mode of operation, the first drive wheel and the second drive wheel are rotated together in different directions.

10. The mobile device of claim 1, wherein the mobile device comprises a toy vehicle including four wheels coupled with the toy vehicle, and at least one of the four wheels is configured as a drive wheel automatically controlled by the control structure.

11. A method of controlling movements of a mobile device, the mobile device including a body, at least one drive wheel coupled with the body, a control structure configured to automatically control rotational movements of the at least one drive wheel, and a motion detection system coupled with the control structure, the method comprising:
   detecting movements of a user via the motion detection system, the motion detection system including:
      a plurality of sensor elements, wherein each sensor element is positioned on a different portion of the body; and
      a detector configured to detect different movements of the user based upon a detected characteristic of the sensor elements with respect to the movements of the user,
   wherein different movements of the user detected by the motion detection system comprise hand or body part gestures by the user in which the user moves a hand or body part in one or more directions at a selected distance from a selected portion of the body of the mobile device and in a selected sequence over at least two sensor elements, and via the control structure, controlling rotational movements of the at least one drive wheel to effect different movements of the body of the mobile device based upon different detected movements of the user.

12. The method of claim 11, wherein the plurality of sensor elements is a plurality of IR (infrared) emitters and the detector is an IR detection sensor, and the detecting movements of the user comprises:

emitting from each IR emitter an IR signal of light that is different from an IR signal of light emitted by every other IR emitter; and detecting at the IR detection sensor different IR signals emitted by the IR emitters and that are reflected from the travel path of emission of the IR signals by the IR emitters.

13. The method of claim 12, wherein the control structure comprises memory including control instructions and a processor, and controlling rotational movements of the at least one drive wheel comprises:

providing electric signals by the IR detection sensor that correspond with detection of different reflected IR signals; and via the processor, utilizing the control instructions stored within memory and electric signals provided by the IR detection sensor to control rotational movements of the at least one drive wheel and corresponding movements of the body of the mobile device.

14. The method of claim 11, wherein the control structure comprises memory including control instructions and a processor, and controlling rotational movements of the at least one drive wheel comprises:

providing electric signals by the detector that correspond with detection of different movements of the user; and via the processor, utilizing the control instructions stored within memory and electric signals provided by the detector to control rotational movements of the at least one drive wheel and corresponding movements of the body of the mobile device.

15. The method of claim 11, wherein the movements of the user result in the control structure effecting different movements of the body of the mobile device that comprise at least two of: forward movement of the body, reverse movement of the body, combined forward and left movement of the body, combined forward and right movement of the body, combined reverse and left movement of the body, and combined reverse and right movement of the body.

16. The method of claim 11, wherein the mobile device further comprises one or more proximity sensors disposed at least one of on a front end of the body of the mobile device and on a rear end of body of the mobile device, and the controlling rotational movements of the at least one drive wheel further comprises:

changing movement of the body of the mobile device via control of the at least one drive wheel in response to detection of an obstacle at a selected distance from the one or more proximity sensors.

17. The method of claim 11, wherein the mobile device further comprises one or more output devices comprising at least one of an audio output device, a video output device and a light emission output device, wherein the method further comprises:

controlling, via the control structure, the one or more output devices to provide different outputs based upon different controlled movements imparted to the body of the mobile device.

18. The method of claim 11, wherein the mobile device further comprises at least one input device, and the method further comprises:

in response to operation of the input device by the user, changing an operation of the mobile device, by controlling rotational movements of the at least one drive wheel by the control structure and based upon detected movements of the user, from one mode of operation to another mode of operation.

19. The method of claim 11, wherein the mobile device further comprises a first drive wheel and a second drive wheel, and the method further comprises:

via the control structure, controlling rotational movements of the first drive wheel and the second drive wheel such that, in a first mode of operation, the first and second drive wheel are rotated together in a same direction and, in a second mode of operation, the first drive wheel and the second drive wheel are rotated together in different directions.

20. The method of claim 11, wherein the mobile device comprises a toy vehicle including four wheels coupled with the body of the mobile device, and at least one of the four wheels is configured as a drive wheel automatically controlled by the control structure.

* * * * *